United States Patent
Dods

(10) Patent No.: US 10,476,629 B2
(45) Date of Patent: Nov. 12, 2019

(54) PERFORMING UPPER LAYER INSPECTION OF A FLOW BASED ON A SAMPLING RATE

(71) Applicant: Juniper Networks, Inc., Sunnyvale, CA (US)

(72) Inventor: Craig Dods, Stittsville (CA)

(73) Assignee: Juniper Networks, Inc., Sunnyvale, CA (US)

(*) Notice: Subject to any disclaimer, the term of this patent is extended or adjusted under 35 U.S.C. 154(b) by 148 days.

(21) Appl. No.: 15/584,625

(22) Filed: May 2, 2017

(65) Prior Publication Data

US 2018/0323898 A1  Nov. 8, 2018

(51) Int. Cl.

| | |
|---|---|
| *H04L 1/00* | (2006.01) |
| *H04L 12/801* | (2013.01) |
| *H04L 12/851* | (2013.01) |
| *H04W 36/28* | (2009.01) |
| *H04L 29/08* | (2006.01) |
| *H04L 29/06* | (2006.01) |
| *H04L 12/803* | (2013.01) |

(Continued)

(52) U.S. Cl.
CPC ............ *H04L 1/002* (2013.01); *H04L 47/127* (2013.01); *H04L 47/2441* (2013.01); *H04L 47/2483* (2013.01); *H04L 63/1408* (2013.01); *H04L 67/22* (2013.01); *H04W 36/28* (2013.01); *H04L 47/125* (2013.01); *H04W 24/02* (2013.01); *H04W 40/18* (2013.01)

(58) Field of Classification Search
CPC ............ H04L 63/1408; H04L 63/1416; H04L 63/1425; H04L 63/1458; H04L 63/20; H04L 67/22; H04L 1/002; H04L 47/127; H04L 47/2441; H04L 47/2483

USPC ......... 370/230, 235, 392, 252; 709/224, 225
See application file for complete search history.

(56) References Cited

U.S. PATENT DOCUMENTS

| | | |
|---|---|---|
| 7,415,723 B2 | 8/2008 | Pandya |
| 7,512,980 B2 | 3/2009 | Copeland et al. |

(Continued)

OTHER PUBLICATIONS

Jawad Khalife, On the Performance of OpenDPI in Identifying P2P Truncated Flows, AP2PS 2011 (Year: 2011).*

(Continued)

*Primary Examiner* — Harun Chowdhury
(74) *Attorney, Agent, or Firm* — Harrity & Harrity, LLP

(57) ABSTRACT

A device may receive a first portion of network traffic associated with a flow. The device may perform a first upper layer inspection of the first portion of network traffic associated with the flow. The device may identify a set of parameters of the flow based on performing the first upper layer inspection of the first portion of network traffic associated with the flow. The device may determine, based on the set of parameters, a sampling rate at which to perform a second upper layer inspection of a second portion of network traffic associated with the flow. The device may instruct a lower layer to use the sampling rate to provide the second portion of network traffic associated with the flow for the second upper layer inspection. The device may perform the second upper layer inspection of the second portion of network traffic associated with the flow based on receiving the second portion of network traffic associated with the flow from the lower layer. The device may perform an action with regard to the flow based on a result of performing the second upper layer inspection.

20 Claims, 8 Drawing Sheets

(51) Int. Cl.
  *H04W 40/18* (2009.01)
  *H04W 24/02* (2009.01)

(56) References Cited

U.S. PATENT DOCUMENTS

| | | | |
|---|---|---|---|
| 9,246,828 B1 | 1/2016 | Tagore | |
| 2007/0153689 A1* | 7/2007 | Strub | H04L 63/1408 |
| | | | 370/230 |
| 2007/0240207 A1 | 10/2007 | Belakhdar et al. | |
| 2008/0307524 A1 | 12/2008 | Singh et al. | |
| 2010/0158009 A1 | 6/2010 | Lee et al. | |
| 2011/0131324 A1* | 6/2011 | Chaturvedi | H04L 63/20 |
| | | | 709/225 |
| 2015/0256431 A1* | 9/2015 | Buchanan | H04L 67/22 |
| | | | 709/224 |
| 2018/0262528 A1* | 9/2018 | Jain | H04L 63/1458 |

OTHER PUBLICATIONS

Marco Canini, Per Flow Packet Sampling for High-Speed Network Monitoring, IEEE Xplore (Year: 2009).*

Khalife et al., "Performance of OpenDPI in Identifying Sampled Network Traffic", Journal of Networks, vol. 8, No. 1, Jan. 2, 2013, 11 pages.

Extended European Search Report for European Application No. 18164727.2; dated Aug. 16, 2018, 13 pages.

Co-pending U.S. Appl. No. 14/718,481, by Bradley S. Woodberg et al., entitled "Services Offloading for Application Layer Services," filed on May 21, 2015, 45 pages.

* cited by examiner

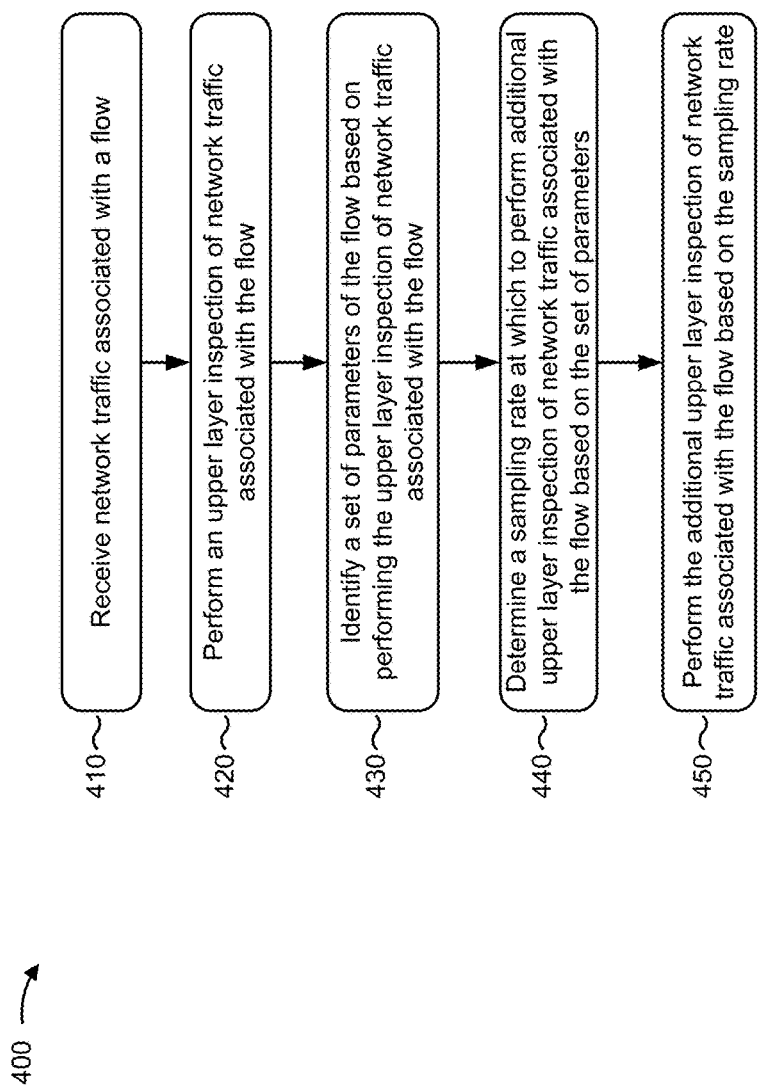

PERFORMING UPPER LAYER INSPECTION OF A FLOW BASED ON A SAMPLING RATE

BACKGROUND

One or more functions of a network device may be described according to the Open Systems Interconnection (OSI) model, which divides the one or more functions into seven hierarchical layers. Layer 7 (L-7) (i.e., the application layer) of the OSI model may be associated with a set of network services performed on application traffic, such as classifying applications, performing protocol inspection, performing application transaction analysis, reporting, applying policies to identify and prevent security issues, or the like. Layer 6 (L-6) (i.e., the presentation layer) of the OSI model may be associated with network services responsible for the delivery and formatting of information to the application layer. Layer 5 (L-5) (i.e., the session layer) of the OSI model may be associated with network services responsible for managing sessions. Layer 4 (L-4) (i.e., the transport layer) of the OSI model may be associated with network services responsible for performing reliability operations, flow control, and/or multiplexing. Layer 3 (L-3) (i.e., the network layer) of the OSI model may be associated with network services responsible for packet forwarding and routing. Layer 2 (L-2) (i.e., the data link layer) may be associated with network services responsible for transferring data between adjacent network devices. Layer 1 (L-1) (i.e., the physical layer) may be associated with network services responsible for translating logical communication requests from the data link layer into hardware specific operations to cause transmission and reception of electronic signals.

SUMMARY

According to some possible implementations, a device may include one or more processors to receive a first portion of network traffic associated with a flow. The one or more processors may perform a first upper layer inspection of the first portion of network traffic associated with the flow. The one or more processors may identify a set of parameters of the flow based on performing the first upper layer inspection of the first portion of network traffic associated with the flow. The one or more processors may determine, based on the set of parameters, a sampling rate at which to perform a second upper layer inspection of a second portion of network traffic associated with the flow. The one or more processors may instruct a lower layer to use the sampling rate to provide the second portion of network traffic associated with the flow for the second upper layer inspection. The one or more processors may perform the second upper layer inspection of the second portion of network traffic associated with the flow based on receiving the second portion of network traffic associated with the flow from the lower layer. The one or more processors may perform an action with regard to the flow based on a result of performing the second upper layer inspection.

According to some possible implementations, non-transitory computer-readable medium may store one or more instructions that, when executed by one or more processors of a device, cause the one or more processors to receive a first portion of network traffic associated with a flow. The one or more instructions may cause the one or more processors to perform a first upper layer inspection of the first portion of network traffic associated with the flow. The one or more instructions may cause the one or more processors to identify a set of parameters of the flow based on performing the first upper layer inspection of the first portion of network traffic associated with the flow. The one or more instructions may cause the one or more processors to determine, based on the set of parameters, a sampling rate at which to perform a second upper layer inspection of a second portion of network traffic associated with the flow. The one or more instructions may cause the one or more processors to instruct a lower layer to use the sampling rate to provide the second portion of network traffic associated with the flow for the second upper layer inspection. The one or more instructions may cause the one or more processors to perform the second upper layer inspection of the second portion of network traffic associated with the flow based on receiving the second portion of network traffic associated with the flow from the lower layer. The one or more instructions may cause the one or more processors to perform an action with regard to the flow based on a result of performing the second upper layer inspection.

According to some possible implementations, a method may include receiving, by a device, network traffic associated with a flow. The method may include identifying, by the device, a set of parameters associated with the flow. The method may include determining, by the device, a sampling rate at which to perform an upper layer inspection of a portion of network traffic associated with the flow based on the set of parameters. The method may include providing, by the device, an instruction to a lower layer to use the sampling rate to provide the portion of network traffic associated with the flow for the upper layer inspection. The method may include performing, by the device, the upper layer inspection of the portion of network traffic associated with the flow based on receiving the portion of network traffic associated with the flow from the lower layer. The method may include performing, by the device, an action with regard to the flow based on a result of performing the upper layer inspection of the portion of network traffic associated with the flow.

BRIEF DESCRIPTION OF THE DRAWINGS

FIG. 4 is a flow chart of an example process for performing upper layer inspection of a flow based on a sampling rate.

DETAILED DESCRIPTION

Figure 1A:
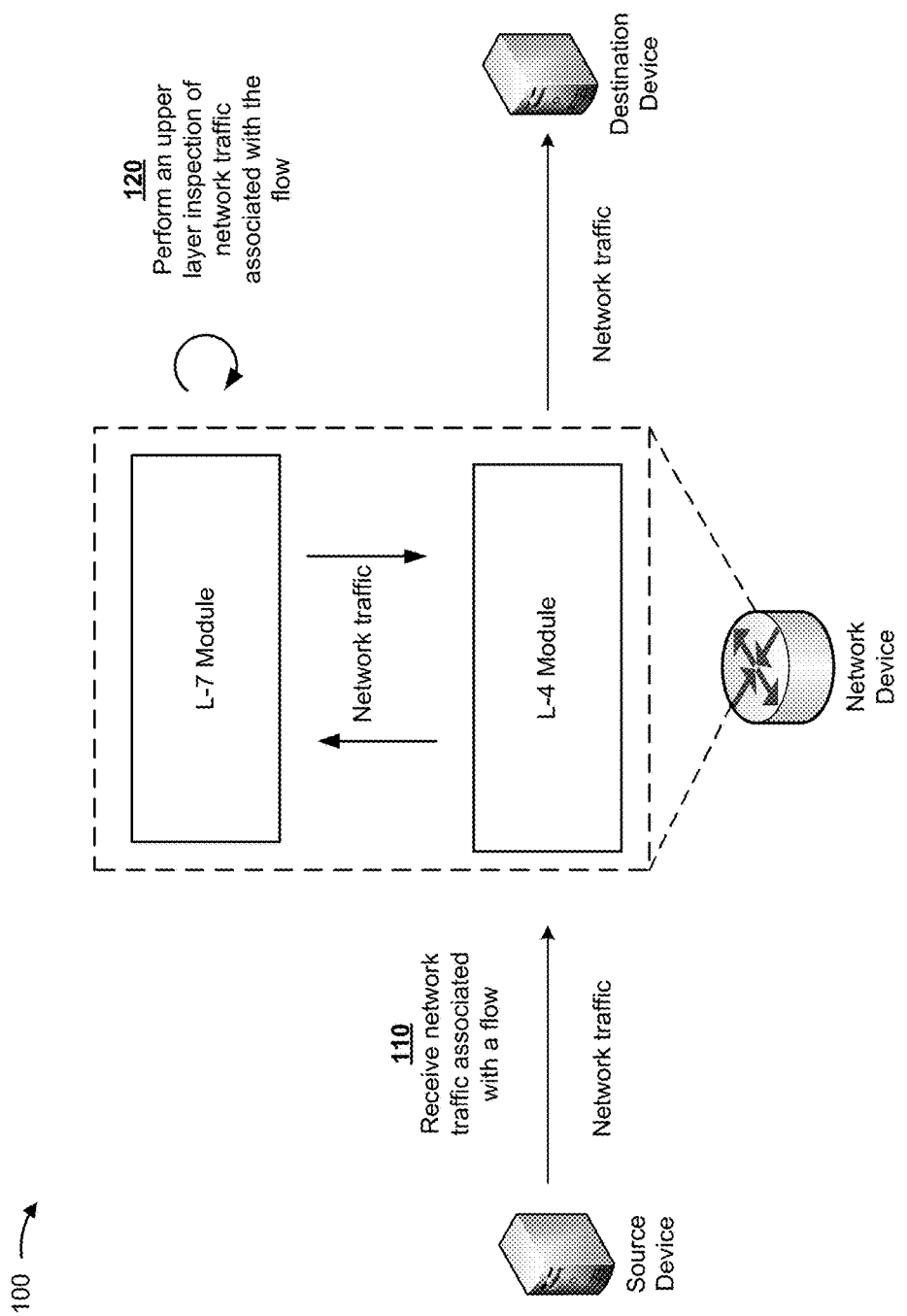
FIGS. 1A-1E are diagrams of an overview of an example implementation described herein.

The following detailed description of example implementations refers to the accompanying drawings. The same reference numbers in different drawings may identify the same or similar elements.

A network device may perform network services that are associated with different layers of the OSI model (e.g., L-7 network services, L-4 network services, L-3 network services, or the like) or another type of communication model. For example, a network device may include a set of modules that perform network services associated with different layers of the OSI model (e.g., modules implemented in hardware, firmware, software executing on hardware, or a combination of multiple different and/or similar modules).

As an example, an L-7 module of the network device may perform application layer services, such as an application identification (AppID) service, an intrusion detection and prevention (IDP) service, a uniform resource locator (URL) filtering service, and/or another type of network service. Additionally, as an example, an L-4 module of the network device may perform transport layer services, such as a flow control service, a multiplexing service, a reliability service, and/or another type of network service.

In some cases, an L-7 module of the network device may perform application layer services on network traffic to identify security issues associated with the network traffic. For example, an L-7 module may identify malware, viruses, worms, Trojan horses, ransomware, spyware, or the like. In this way, a network device may improve network security by performing L-7 network services to identify security issues. However, in some cases, L-7 network services may be more computationally expensive than as compared to L-4 network services or other lower layer network services. Additionally, utilization of L-7 network services may result in reduced throughput, increased latency, or the like, as compared to situations where lower layer network services are performed and/or L-7 network services are not performed on network traffic.

In some cases, an L-7 module may perform L-7 network services on every packet associated with a flow (e.g., a sequence of packets that includes some common values), thereby improving network security. However, utilization of the L-7 module in such a manner may be computationally expensive and may result in reduced network performance.

In other cases, an L-7 module may perform L-7 network services on a pre-configured number of packets (e.g., the first packet of a flow, the first ten packets of a flow, or the like), and offload processing of subsequent network traffic of the flow to the L-4 module. In such cases, the network device may receive additional network traffic of the flow, and provide the additional network traffic to the L-4 module without providing the network traffic to the L-7 module, thereby preventing upper layer network services from being performed. In this way, the network device may conserve computing resources and improve network performance. However, a security issue that was not identified or prevalent in the first packet, the first ten packets, or the like, may be prevalent in subsequent network traffic of the flow. In such cases, the network device may fail to identify security issues by failing to perform upper layer inspection of the subsequent network traffic of the flow.

Some implementations described herein provide a network device that may receive network traffic associated with a flow, and perform an upper layer inspection of network traffic associated with the flow. For example, the network device may perform the upper layer inspection on the first packet, the first ten packets, the first thirty packets, or the like.

Additionally, some implementations described herein provide a network device that may identify a set of parameters of the flow based on performing the upper layer inspection of network traffic associated with the flow. For example, the network device may identify a set of parameters, such as an L-7 protocol, an L-7 application, a source network address, a destination network address, a port identifier, an L-4 protocol, a geolocation of a source device associated with the flow, a geolocation of a destination device associated with the flow, and/or other parameters as described elsewhere herein.

Additionally, some implementations described herein provide a network device that may determine a sampling rate at which to perform additional upper layer inspection of network traffic of the flow based on the set of parameters, and perform the additional upper layer inspection of network traffic associated with the flow based on the sampling rate. For example, a sampling rate may refer to a number of packets, on which upper layer network services are performed, compared to a total number of packets of the flow that are received by the network device. As examples, a sampling rate of 100% may identify that upper layer network services are to be performed on every packet of the flow, whereas a sampling rate of 20% may identify that upper layer network services are to be performed on one packet per every five packets that are received by the network device.

As described elsewhere herein, the network device may determine a sampling rate based on particular values associated with the set of parameters. In this way, the network device may perform upper layer network services more frequently on network traffic that is more likely to include security issues, and may perform upper layer network services less frequently on network traffic that is less likely to include security issues.

Still further, some implementations described herein provide a network device that may adjust a sampling rate based on a condition, such as a packet count of the flow, a byte count of the flow, a duration of the flow, or the like. For example, the network device may reduce the sampling rate after a particular number of packets have been transferred, after a particular number of bytes have been transferred, or the like. In some cases, security issues may be more likely to occur in association with a start of a flow (e.g., the first megabyte (MB), or the like) than as compared to another portion of the flow. In this way, the network device may perform more upper layer inspection on network traffic that is more likely to include security issues, and perform less upper layer inspection on network traffic that is less likely to include security issues.

In this way, some implementations described herein conserve processor and/or memory resources of a network device and improve network performance in situations where the network device implements a lower sampling rate (e.g., indicating less frequent upper layer inspection) in association with flows that include lower security risks, and improve network security in situations where the network device implements a greater sampling rate (e.g., indicating more frequent upper layer inspection) in association with flows that are more likely to include security issues.

Although described herein in terms of an L-7 layer and an L-4 layer, implementations, described herein, may also refer to other layers, such as an L-6 layer, and L-5 layer, an L-3 layer, an L-2 layer, and/or an L-1 layer.

FIGS. 1A-1E are diagrams of an overview of an example implementation 100 described herein. As shown in FIG. 1A, and by reference number 110, a network device may receive network traffic associated with a flow. For example, the network device may receive network traffic that is to be transferred between a particular source device and a particular destination device. As shown, the network device may include an L-7 module that performs L-7 network services, and an L-4 module that performs L-4 network services.

As further shown in FIG. 1A, and by reference number 120, the network device may perform an upper layer inspection of network traffic associated with the flow. For example, the L-7 module may receive the network traffic from the L-4 module, and perform an upper layer inspection of the network traffic.

Figure 1B:
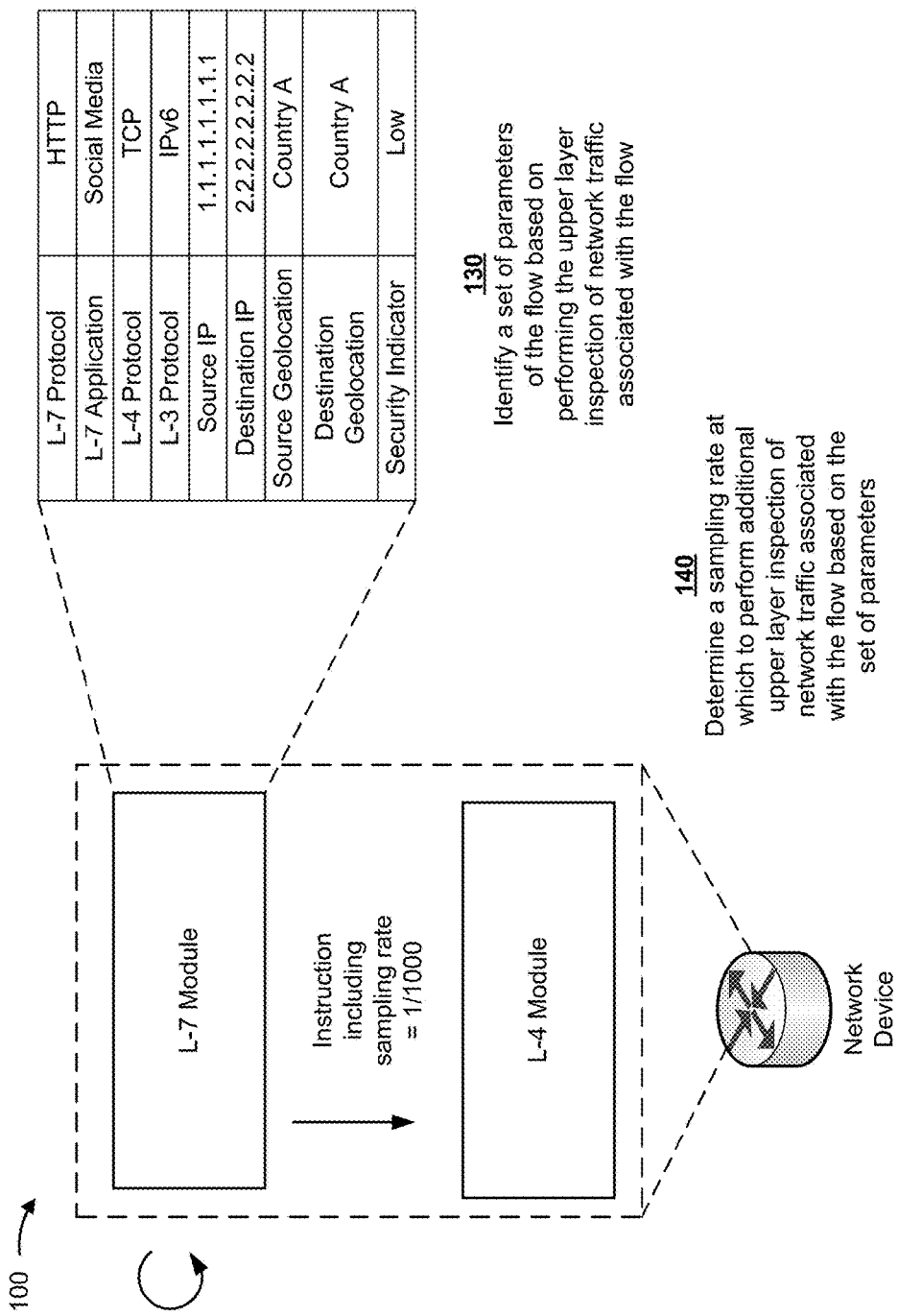

As shown in FIG. 1B, and by reference number 130, the network device may identify a set of parameters of the flow based on performing the upper layer inspection of network traffic associated with the flow. For example, as shown, the L-7 module may identify an L-7 protocol, an L-7 application, a geolocation of the source device, a geolocation of the destination device, and one or more other parameter values associated with one or more other parameters. Additionally, as shown, the L-7 module may identify a security indicator associated with the flow. As described elsewhere herein, a security indicator may include information that identifies a likelihood that the flow is associated with a security issue. For example, as shown, the network device may determine a security indicator of "low" that indicates that the flow is not likely to be associated with a security issue.

As further shown in FIG. 1B, and by reference number 140, the network device may determine a sampling rate at which to perform additional upper layer inspection of network traffic associated with the flow based on the set of parameters. For example, as shown, the network device may determine a sampling rate of one packet per every thousand packets (i.e., 0.1%). As described elsewhere herein, the network device may determine a sampling rate based on parameter values of the set of parameters. For example, the network device may store information that maps parameter values and sampling rates, may implement machine learning techniques, may be pre-configured with a sampling rate, or the like. As shown, the L-7 module may provide, to the L-4 module, an instruction that identifies the sampling rate and/or that causes the L-4 module to provide network traffic to the L-7 module based on the sampling rate.

Figure 1C:
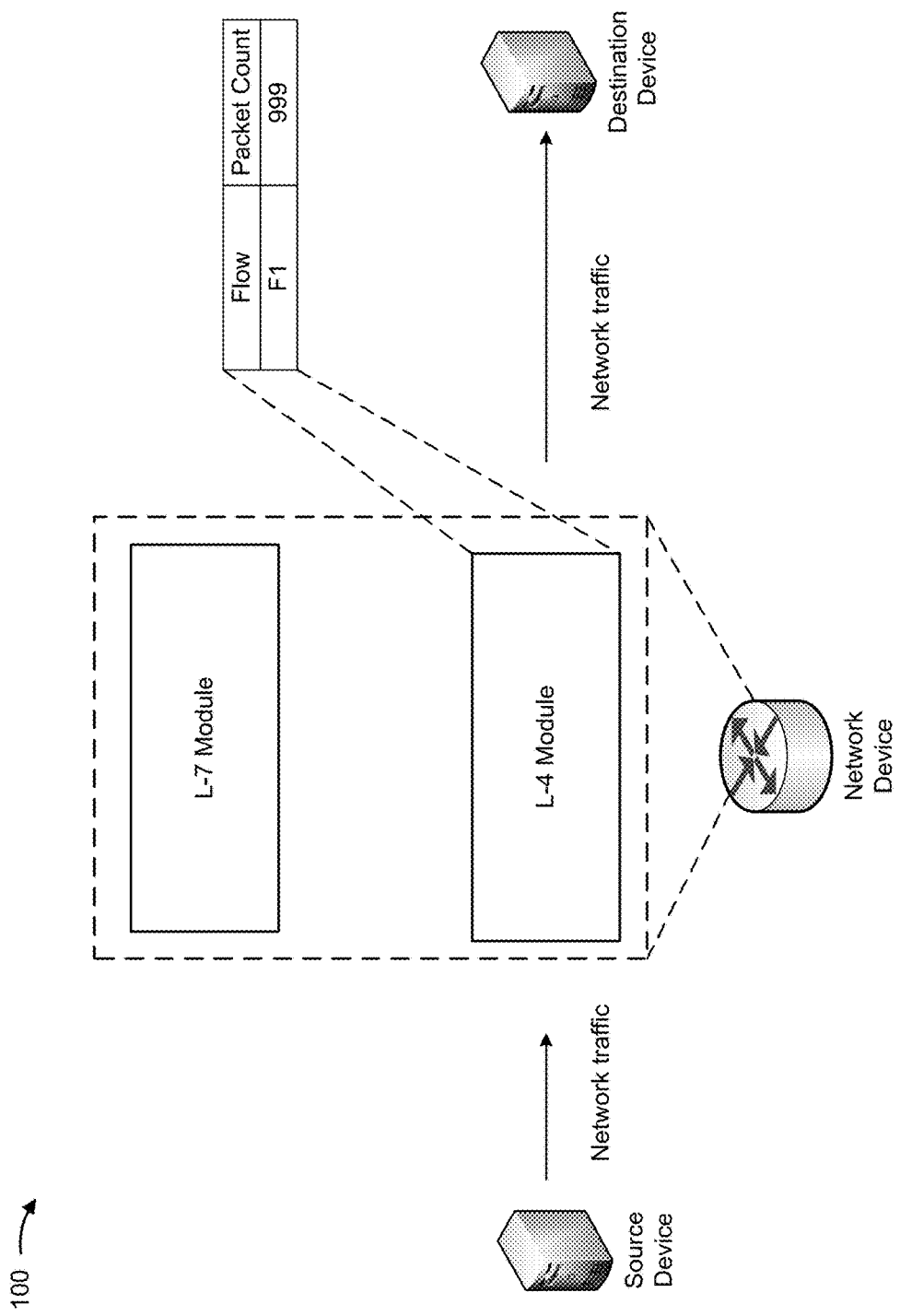

As shown in FIG. 1C, the L-4 module may receive subsequent network traffic associated with the flow (e.g., "F1"). For example, as shown, the L-4 module may store an entry in a data structure that includes information that identifies the flow and a packet count associated with the flow. As further shown in FIG. 1C, the L-4 module may transfer network traffic between the source device and the destination device without providing the network traffic to the L-7 module. In this way, the network device may conserve processor and/or memory resources, improve throughput, reduce latency, or the like, by preventing upper layer inspection of a portion of network traffic.

As further shown in FIG. 1C, assume that 999 packets have been transferred in association with the flow. In this case, the L-4 module may provide the next packet that is received (i.e., the 1000$^{th}$ packet) to the L-7 module pursuant to the sampling rate (i.e., one packet per every thousand packets), as described below.

Figure 1D:
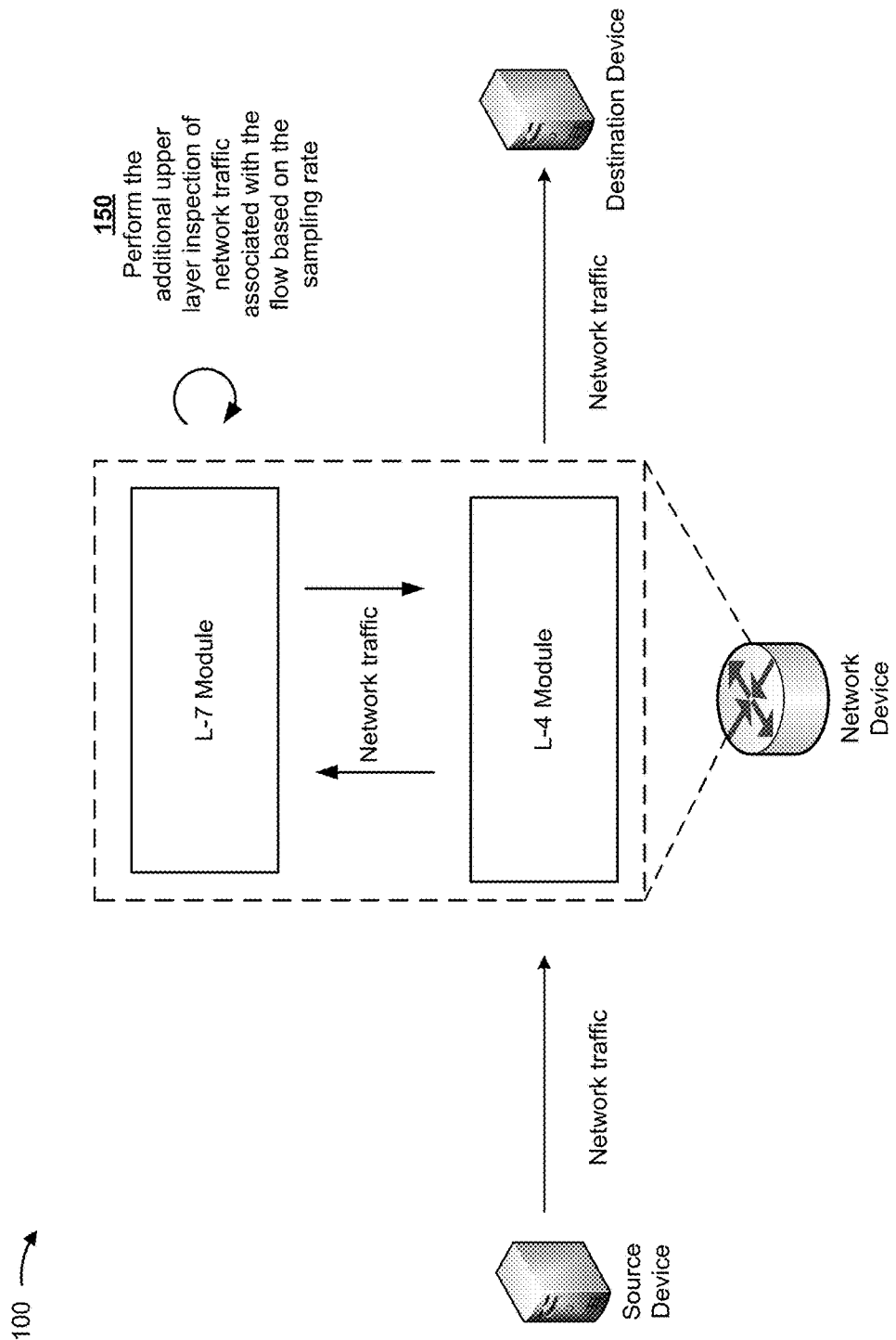

As shown in FIG. 1D, and by reference number 150, the network device may perform the additional upper layer inspection of network traffic associated with the flow based on the sampling rate. For example, as shown, the L-7 module may receive, from the L-4 module, network traffic associated with the flow and perform upper layer inspection of the network traffic.

Figure 1E:
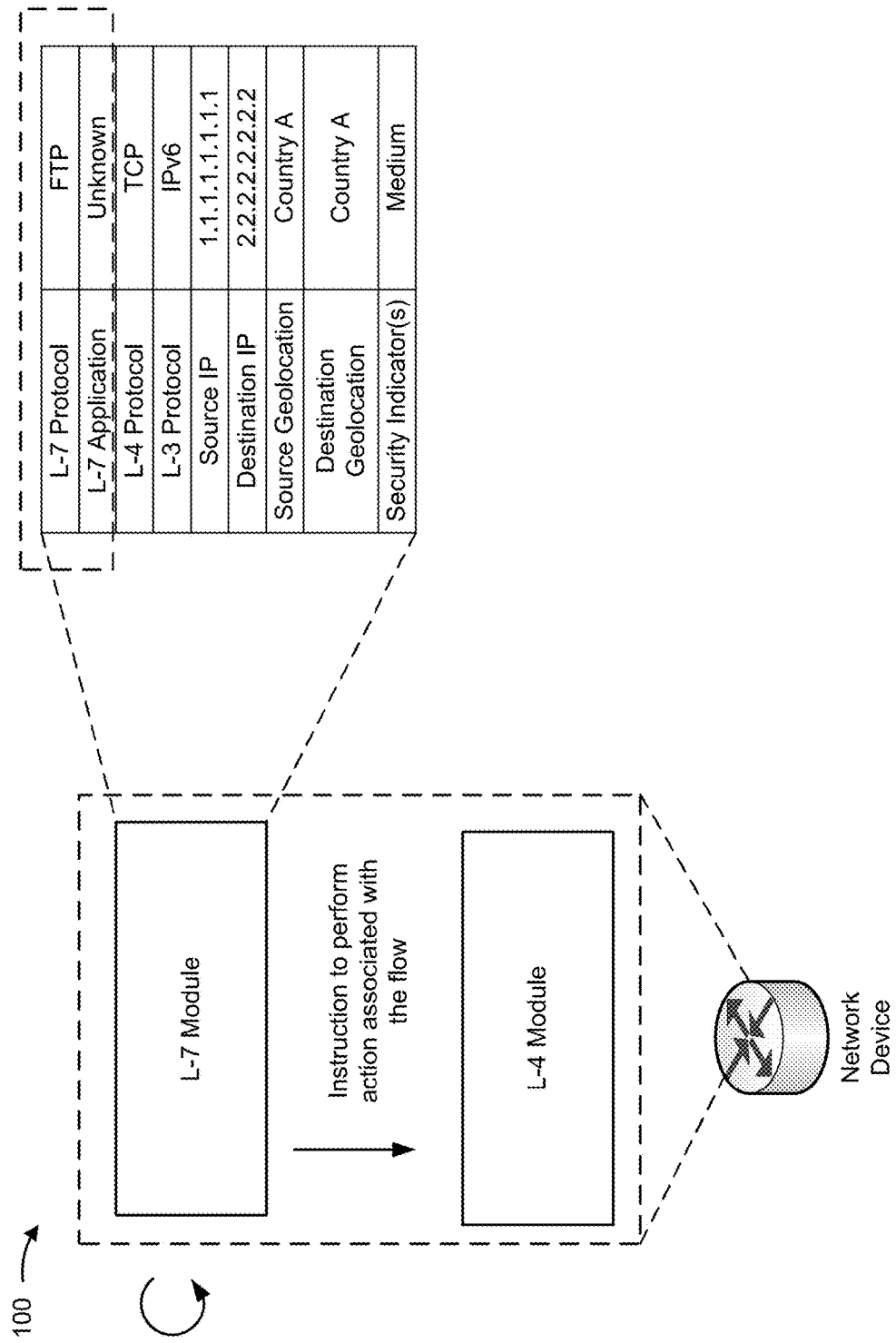

As shown in FIG. 1E, the network device may identify a set of parameters associated with the flow in a similar manner as described above in connection with FIG. 1B. As shown, assume that the network device (e.g., the L-7 module) determines that the L-7 protocol and L-7 application have changed as compared to the determination made in association with FIG. 1B. In this case, and as shown, the L-7 module may provide, to the L-4 module, an instruction to perform an action in association with the flow, such as denying subsequent network traffic, providing subsequent network traffic to the L-7 module for additional upper layer inspection, or the like.

In this way, some implementations described herein provide a network device that may identify parameter values of a flow based on performing an upper layer inspection, and determine a sampling rate based on the particular parameter values. In this way, some implementations described herein enable the network device to perform upper layer inspection more or less frequently depending on a likelihood of the network traffic including security issues.

As indicated above, FIGS. 1A-1E are provided merely as an example. Other examples are possible and may differ from what was described with regard to FIGS. 1A-1E.

Figure 2:
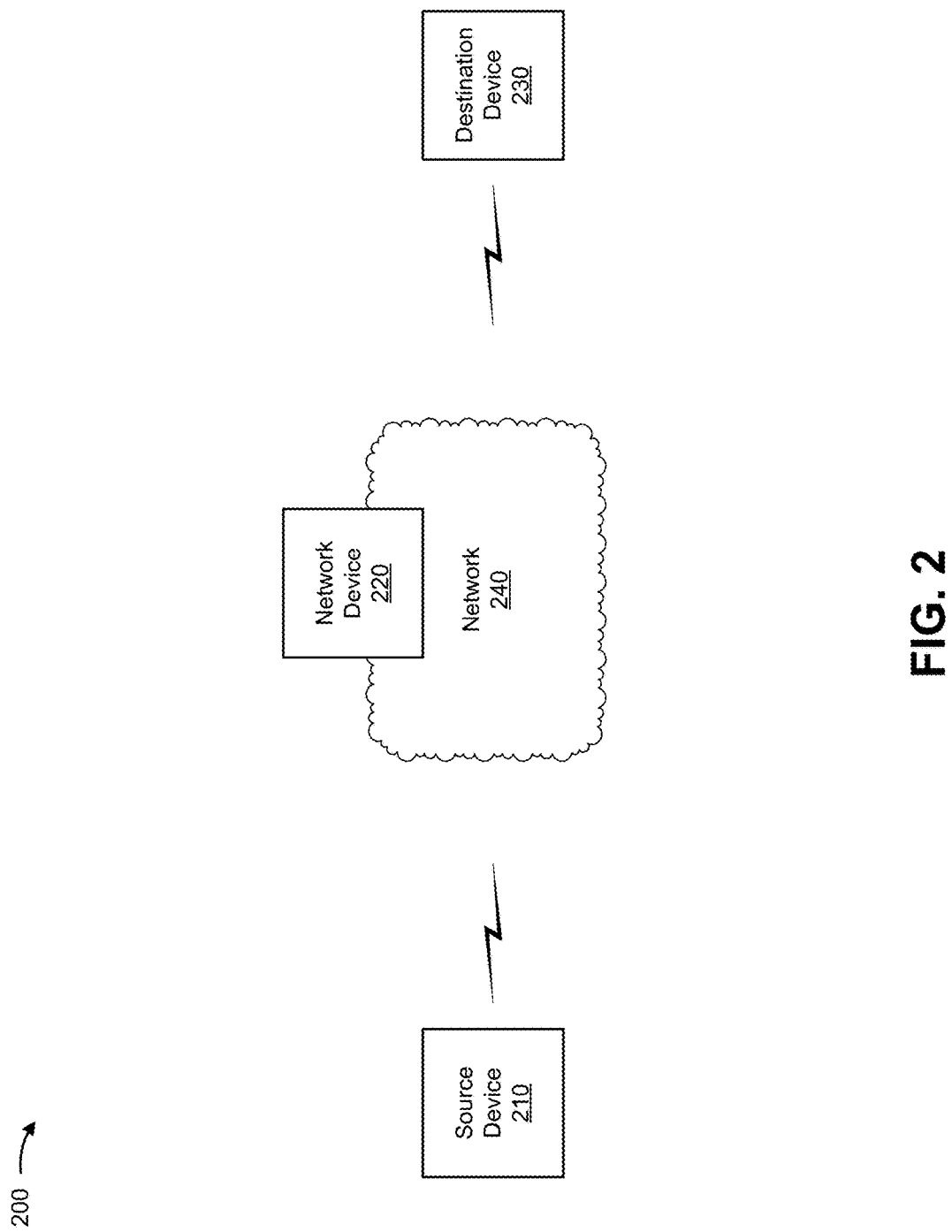
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a source device 210, a network device 220, a destination device 230, and a network 240. Devices of environment 200 may interconnect via wired connections, wireless connections, or a combination of wired and wireless connections.

Source device 210 includes or more devices capable of providing and/or receiving network traffic (e.g., packets). For example, source device 210 may include a user device, a server device, an endpoint device, an edge device, or another device that can be a source or a destination of network traffic. In some implementations, source device 210 may provide network traffic via a session, such as a transmission control protocol (TCP) session. For example, source device 210 may transmit network traffic to destination device 230 via a TCP session that includes a set of network traffic transactions. A transaction may include a particular file being transmitted via a session, such as an audio video file, a video file, a multimedia file, a database file, or the like.

Network device 220 includes one or more devices capable of processing and transferring network traffic between source device 210 and destination device 230. For example, network device 220 may include a router, a gateway, a switch, a firewall, a hub, a bridge, a reverse proxy, a server (e.g., a proxy server, a server executing a virtual machine, etc.), a security device, an intrusion detection device, a load balancer, a line card (e.g., in a chassis-based system), or a similar type of device. In some implementations, network device 220 may be a physical device implemented within a housing, such as a chassis. In implementations, network device 220 may be a virtual device implemented by one or more computer devices of a cloud computing environment or a data center.

In some implementations, network device 220 may receive network traffic via a network tap, via inline network traffic receipt, or the like. In some implementations, network device 220 may include a set of common form-factor module (CFM) cards, such as a services processing card (SPC), a network processing card (NPC), or the like. In some implementations, the SPC may perform upper layer network services, and the NPC may perform lower layer network services.

In some implementations, network device 220 may include an L-7 module for performing an L-7 inspection. For example, network device 220 may include an L-7 module that performs L-7 network services, such as an AppID service, an intrusion prevention system (IPS) service, an IDP service, a URL filtering service, a content filtering service, a content inspection service, a payload inspection service, an anti-virus service, an anti-malware service, a geolocation Internet protocol (GeoIP) service, a security intelligence (SecIntel) service, a quality of service (QoS) service, or the like.

In some implementations, network device 220 may include an L-4 module for performing L-4 inspection. For example, network device 220 may include an L-4 module that performs L-4 network services.

As used herein, a packet may refer to a communication structure for communicating information, such as a protocol data unit (PDU), a network packet, a datagram, a segment, a block, a cell, a frame, a subframe, a slot, a symbol, a portion of any of the above, and/or another type of formatted or unformatted unit of data capable of being transmitted via a network.

As used herein, a flow may refer to a sequence of packets that share common information, such as five-tuple information (e.g., a source address, a destination address, a source port identifier, a destination port identifier, and a protocol identifier).

Destination device 230 includes or more devices associated with providing and/or receiving network traffic (e.g., packets). For example, destination device 230 may include a user device, a server device, an endpoint device, an edge device, or another device that can be a source or a destination of network traffic.

Network 240 includes one or more wired and/or wireless networks. For example, network 240 may include a cellular network (e.g., a fifth generation (5G) network, a long-term evolution (LTE) network, a code division multiple access (CDMA) network, a third generation (3G) network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
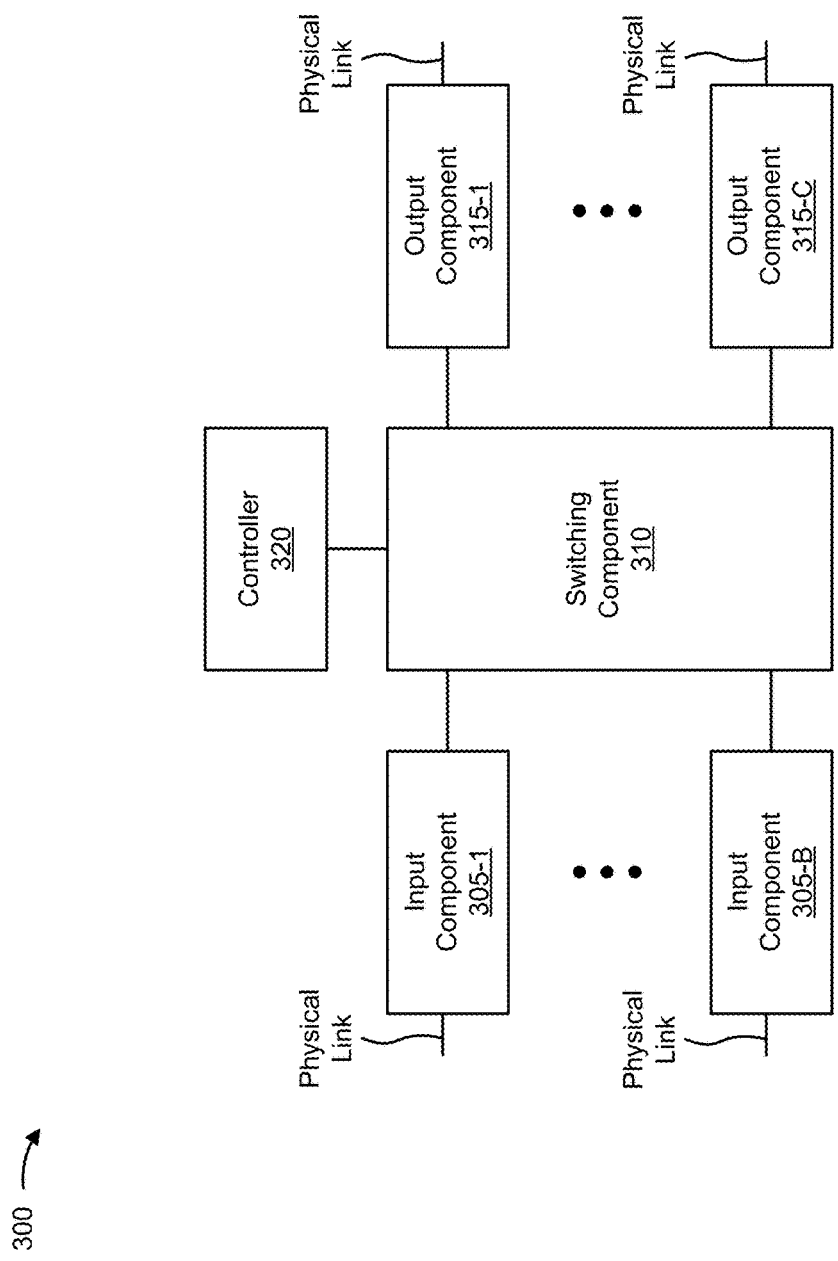
FIG. 3 is a diagram of example components of one or more devices of FIG. 2.

FIG. 3 is a diagram of example components of a device 300. Device 300 may correspond to source device 210, network device 220, and/or destination device 230. In some implementations, source device 210, network device 220, and/or destination device 230 may include one or more devices 300 and/or one or more components of device 300. In some implementations, device 300 may be implemented as a virtual device that is implemented within a cloud computing environment, such as implemented as a virtual machine that executes on one or more cloud computing devices (e.g., servers) in the cloud computing environment.

As shown in FIG. 3, device 300 may include one or more input components 305-1 through 305-B (B≥1) (hereinafter referred to collectively as input components 305, and individually as input component 305), a switching component 310, one or more output components 315-1 through 315-C (C≥1) (hereinafter referred to collectively as output components 315, and individually as output component 315), and a controller 320.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., and input/output component may be a combination of input component 305 and output component 315).

Controller 320 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. The processor is implemented in hardware, firmware, or a combination of hardware and software. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for performing upper layer inspection of a flow based on a sampling rate. In some implementations, one or more process blocks of FIG. 4 may be performed by network device 220. In some implementations, one or more process blocks of FIG. 4 may be performed by another device or a group of devices separate from or including network device 220, such as source device 210, destination device 230, a management device, or the like. In some implementations, one or more process blocks of FIG. 4 may be performed by an L-7 module of network device 220. In some implementations, one or more process blocks of FIG. 4 may be performed by another module or a group of modules separate from or including the L-7 module, such as an L-4 module, an L-3 module, or another module.

As shown in FIG. 4, process 400 may include receiving network traffic associated with a flow (block 410). For example, network device 220 may receive network traffic to be transferred between source device 210 and destination device 230.

In some implementations, source device 210 and destination device 230 may establish a session that includes a set of network traffic transactions. For example, the session may refer to an Internet protocol (IP) session, a TCP session, a user datagram protocol (UDP) session, a general packet radio service (GPRS) tunneling protocol (GTP) session, a general routing encapsulation (GRE) session, or the like. Additionally, as an example, a network traffic transaction may refer to a request, a response, a file transfer, or the like. In some implementations, the flow may refer to a sequence of packets that are provided in association with the session.

In this way, network device 220 may receive network traffic associated with a flow to permit network device 220 to perform an initial upper layer inspection of network traffic associated with the flow, as described below.

As further shown in FIG. 4, process 400 may include performing an upper layer inspection of network traffic associated with the flow (block 420), and identifying a set of parameters of the flow based on performing the upper layer inspection of network traffic associated with the flow (block 430). For example, network device 220 may perform an upper layer inspection (e.g., an L-7 inspection) on packets of the flow, and identify a set of parameters of the flow.

In some implementations, network device 220 (e.g., the L-7 module) may perform the upper layer inspection in association with a set of network services. For example, network device 220 may perform a set of network services as described above in connection with FIG. 2 (e.g., an AppID service, a URL filtering service, an IDP service, a GeoIP service, or the like). In some implementations, network device 220 may identify a set of parameters associated with the flow based on a set of techniques, such as a deep packet inspection (DPI) technique, a signature-based pattern matching technique, a heuristic matching technique, a predictive session matching technique, an application caching technique, or the like.

In some implementations, a parameter may refer to an L-7 protocol (e.g., hypertext transfer protocol (HTTP), HTTP secure (HTTPs), simple mail transfer protocol (SMTP), file transfer protocol (FTP), real time streaming protocol (RTSP), or the like). Additionally, or alternatively, a parameter may refer to an L-7 application (e.g., a multimedia application, an email application, a peer-to-peer application, a remote-access application, a social-networking application, a web application, a gaming application, a messaging application, or the like). In some implementations, a parameter may identify a particular L-7 application (e.g., Facebook) and/or a group to which the particular L-7 application belongs (e.g., social-networking applications).

In some implementations, a parameter may refer to an L-3 protocol, an L-4 protocol, a source network address, a destination network address, a source port identifier, a destination port identifier, or the like. Additionally, or alternatively, a parameter may refer to a geolocation of source device 210, and/or a geolocation of destination device 230.

In some implementations, a parameter may refer to a security indicator. In some implementations, a security indicator may refer to a score, a designation, a value, or the like that is indicative of a security issue, a risk, a threat, a reputation, a level of trust, or the like. For example, a low security indicator may be indicative of a low security risk, a low threat, a high level of trust, or the like. Additionally, as an example, a high security indicator may be indicative of a high security risk, a high threat, a low level of trust, or the like. In some implementations, a parameter may refer to a security indicator associated with a URL associated with the network traffic, an entity (e.g., organization, company, business, etc.) associated with source device 210, a geolocation of source device 210, an entity associated with destination device 230, a geolocation of source device 210, the L-7 application, the L-7 protocol, or the like.

In some implementations, network device 220 may query a data structure (e.g., a local data structure, an external data structure, or the like) for information regarding security indicators, and identify one or more security indicators after querying the data structure.

In some implementations, network device 220 (e.g., the L-7 module) may perform the upper layer inspection on an initial portion of network traffic associated with the flow. For example, network device 220 may perform the upper layer inspection on the first packet, the first four packets, the first fifteen packets, etc. of the flow. In some implementations, different L-7 services may inspect a different number of packets associated with the flow. For example, the AppID service may inspect the first twenty packets, the IPS service may inspect the first ten packets, the URL filtering service may inspect the first four packets, or the like.

In some implementations, network device 220 may store, in a data structure (e.g., a table, a flow table, a cache, or the like), information associated with the flow. For example, network device 220 may store an entry that identifies a set of parameter values that correspond to the set of parameters. In some implementations, different network services may determine particular parameter values. In other words, network device 220 may store parameter values that were determined by various network services. Additionally, or alternatively, network device 220 may store information that identifies an action to be performed in association with the flow, such as permit, filter, deny, log, quarantine, redirect, rate limit, prioritize, or the like.

In some implementations, network device 220 (e.g., the L-7 module) may offload processing of additional network traffic after performing the upper layer inspection on the initial portion of network traffic. For example, network device 220 (e.g., the L-7 module) may offload, to an L-4 module, responsibility for processing another portion of network traffic associated with the flow. In this way, network device 220 may receive network traffic to be transferred between source device 210 and destination device 230, and prevent upper layer inspection from being performed in association with the network traffic. That is, network device 220 (e.g., the L-4 module) may perform lower layer inspection of the network traffic for which processing responsibility has been offloaded.

In this way, network device 220 may perform an initial upper layer inspection in association with an initial portion of network traffic associated with the flow, and determine a particular action to be performed in association with the flow. Additionally, in this way, network device 220 (e.g., the L-7 module) may offload responsibility of processing additional network traffic after performing the initial upper layer inspection, thereby conserving processor and/or memory resources of network device 220 by reducing an amount of upper layer inspection that is performed, and thereby increasing throughput, reducing latency, or the like.

However, security issues that were not present in the initial portion of network traffic, that were not identified in the initial portion of network traffic, or the like, may occur in association with subsequent network traffic associated with the flow. Thus, network device 220 may determine a sampling rate at which additional upper layer inspection is to be performed in association with the subsequent network traffic associated with the flow, as described below.

As further shown in FIG. 4, process 400 may include determining a sampling rate at which to perform additional upper layer inspection of network traffic associated with the flow based on the set of parameters (block 440). For example, network device 220 may determine a sampling rate at which to perform upper layer inspection on subsequent network traffic associated with the flow.

In some implementations, a sampling rate may refer to an amount of network traffic on which network device 220 is to perform upper layer inspection in relation to a total amount of network traffic that is received by network device 220. For example, a sampling rate may refer to a number of packets on which network device 220 performs upper layer inspection in relation to a total number of packets that are received by network device 220.

As a particular example, a sampling rate of 0.001, 0.1%, 1/1000, or the like, may identify that network device 220 is to perform upper layer inspection on one packet per every one thousand packets that are received. As another example, a sampling rate of 1 or 100% may identify that network device 220 is to perform upper layer inspection on every packet that is received by network device 220.

In some implementations, network device 220 may determine a sampling rate based on a configuration. For example, network device 220 may store and/or access information that maps a set of parameter values and a sampling rate, and determine the sampling rate after accessing the information.

In some implementations, network device 220 may determine a sampling rate based on a model. In some implementations, network device 220 may use machine learning techniques to analyze data (e.g., training data, such as historical data, etc.) and train models. The machine learning techniques may include, for example, supervised and/or unsupervised techniques, such as artificial networks, Bayesian statistics, learning automata, Hidden Markov Modeling, linear classifiers, quadratic classifiers, decision trees, association rule learning, or the like. In some implementations, network device 220 may use another kind of computer-implemented technique, such as artificial intelligence, machine perception, or computer vision, to analyze parameter values and determine sampling rates.

In some implementations, network device 220 may receive information that identifies a set of parameter values, and information associated with a set of known sampling rates. Additionally, network device 220 may train a model based on the known parameter values and the known sampling rates. In some implementations, network device 220 may train the model using millions, billions, trillions, etc. of the known parameter values. As such, network device 220 may use a big data technique to train the model as such a large volume of data cannot be processed objectively by a human operator.

In some implementations, a device separate from network device 220, such as a network management device, a cloud computing resource of a cloud computing environment, a server of a data center, or the like, may train the model. For example, the device may receive training data from one or more network devices 220 operating in a network, from data logs, from a file provided by an operator, or the like. Due to the potentially large volume of data used to train the model, offloading the training of the model to another device may improve operation of network device 220, may reduce utilization of processor and memory resources of network device 220, and the like. In such a situation, the device may provide the model for use by network device 220 to determine a sampling rate based on an input set of parameter values.

In some implementations, the model may output a sampling rate. In other implementations, the model may output a security indicator that may be then mapped to a sampling rate.

In this way, network device 220 may receive information associated with flows, and determine sampling rates based on parameter values associated with the flows and a model. That is, network device 220 may input parameter values into the model and determine a sampling rate based on the parameter values.

In some implementations, network device 220 may receive information that identifies a set of parameter values of flows, and information that identifies a set of known statuses of the flows. For example, a status may refer to whether a particular flow included a security issue (e.g., security issue present, security issue absent, security issue unknown, etc.). Additionally, network device 220 may train a model based on the known parameter values and known statuses, and use the model to determine sampling rates.

In some implementations, network device 220 may determine a sampling rate based on a direction associated with the flow. For example, network device 220 may determine a first sampling rate for network traffic that is received from source device 210 (e.g., that is to be provided to destination device 230), and determine a second sampling rate for network traffic that is received from destination device 230 (e.g., that is to be provided to source device 210). In other words, network device 220 may perform upper layer inspection of network traffic more or less frequently based on a direction of the network traffic.

As an example, assume that source device 210, an entity associated with source device 210, a geolocation of source device 210, or the like, is associated with higher security indicators than as compared to security indicators associated with destination device 230. In this case, the first sampling rate may include a frequency that is greater than a frequency of the second sampling rate (e.g., because network traffic provided by source device 210 is associated with a higher security risk than as compared to network traffic provided by destination device 230). By determining a sampling rate on a directional basis, network device 220 improves network security by performing upper layer inspection more frequently on network traffic that is provided from less trustworthy devices, less trustworthy geolocations, less trustworthy applications, or the like, and improves network performance and conserves computing resources by performing less upper layer inspection on network traffic that is provided from more trustworthy devices, more trustworthy geolocations, etc.

In some implementations, network device 220 may determine a sampling rate based on a network service. For example, network device 220 may determine a first sampling rate for a first network service (e.g., an AppID service), a second sampling rate for a second network service (e.g., an IPS service), a third sampling rate for a third network service (e.g., a payload inspection service), etc. In other words, different network services of network device 220 may require different sampling rates to identify security risks.

By determining a sampling rate on a network service basis, network device 220 improves network security by providing network traffic to a particular service more or less frequently depending on characteristics of the network service. In other words, different network services may require more or less network traffic in order to identify security issues. In this way, network device 220 more efficiently utilizes network services.

In some implementations, network device 220 (e.g., the L-7 module) may generate an instruction, and provide the instruction to the L-4 module. For example, the instruction may identify the sampling rate(s), and cause the L-4 module to provide network traffic to the L-7 module based on the sampling rate(s). As an example, assume that the sampling rate is 0.002. In this case, the L-4 module may receive five hundred packets, and provide one of the packets to the L-7 module for upper layer inspection. In this way, the L-7 module may receive the packet, and perform an upper layer inspection on the packet, as described below.

As further shown in FIG. 4, process 400 may include performing the additional upper layer inspection of network traffic associated with the flow based on the sampling rate (block 450). For example, network device 220 (e.g., the L-7 module) may perform upper layer inspection on network traffic associated with the flow that is provided to the L-7 module based on the sampling rate.

In some implementations, network device 220 (e.g., the L-7 module) may perform the upper layer inspection on the network traffic, and identify a set of parameters in a similar manner as described above in connection with block 430. In some implementations, network device 220 may compare the set of parameters (e.g., identified based on the additional upper layer inspection) and an entry associated with the initial upper layer inspection. For example, network device 220 may determine whether one or more parameter values of the flow have changed, such as whether the L-7 application has changed, whether the L-7 protocol has changed, whether an IP address of source device 210 or destination device 230 has changed, or the like. In situations where a parameter value has changed, network device 220 may perform an action in association with the flow, such as denying network traffic, causing additional upper layer inspection to be performed, or the like.

In some implementations, network device 220 may perform the upper layer inspection to identify security issues. For example, network device 220 may inspect payload content to identify malware, viruses, worms, Trojan horses, ransomware, spyware, adware, scareware, or the like. In such cases, network device 220 may perform an action in association with the flow based on identifying a security issue (e.g., may drop the network traffic, may provide an alert to another device, may update a policy, or the like).

In some implementations, network device 220 may adjust a sampling rate based on a condition. In some implementations, a condition may refer to a period of time (e.g., a duration of the flow), a number of packets, a number of bytes, a completion of a particular transaction, a start of a new transaction, or the like. As an example, network device 220 may determine a first sampling rate for a first set of data of the flow (e.g., a first group of packets), determine a second sampling rate for a second set of data of the flow (e.g., a second group of packets), determine a third sampling rate for a third set of data of the flow (e.g., a third group of packets), or the like. Continuing with the example, the first sampling rate may include a higher frequency than as compared to a frequency of the second sampling rate, the second sampling rate may include a higher frequency than as compared to a frequency of the third sampling rate, etc.

In some implementations, network device 220 may determine additional sampling rates based on performing the additional upper layer inspection. That is, network device 220 may perform operations associated with block 420 through block 440 in accordance with the additional upper layer inspection(s).

In other words, network device 220 may adjust (e.g., reduce) a sampling rate based on conditions associated with the flow. For example, security risks may be more likely to occur in association with particular portions of the flow (e.g., the first MB, or the like). In this way, some implementations herein may conserve processor and/or memory resources of network device 220 and improve network performance by reducing a sampling rate in association with portions of a flow that are less likely to include security risks.

As a particular example, assume that source device 210 provides an HTTPs request to destination device 230 which is an email server located in a particular country. For this example, and as used herein, "client-to-server" may refer to network traffic provided from source device 210 to destination device 230, and "server-to-client" may refer to network traffic provided from destination device 230 to source device 210. In this case, network device 220 may receive the HTTPs request, identify that the L-7 protocol is HTTPs, identify that the L-7 application is an email application, identify that destination device 230 is associated with a particular geolocation having a low security indicator, etc.

Continuing with the example, network device 220 (e.g., the L-7 module) may provide, to the L-4 module, an instruction that identifies that, for a byte count range of the flow (e.g., 0 kilobytes (KB)-500 KB), the L-4 module is to provide 100% of client-to-server network traffic and 100% of server-to-client network traffic to the L-7 module for upper layer inspection. Additionally, the instruction (or another instruction) may identify that, for another byte count range of the flow (e.g., 500 KB-1 MB), the L-4 module is to provide 50% of client-to-server network traffic and 100% of server-to-client network traffic to the L-7 module. Still further, the instruction (or another instruction) may identify that, for another byte count range of the flow (e.g., 1 MB-3 MB), the L-4 module is to provide 0% of client-to-server network traffic and 50% of server-to-client network traffic to the L-7 module. Additionally, the L-7 module may provide an instruction that identifies that particular packets, that include byte counts (e.g., a payload byte count) that satisfy a threshold (e.g., greater than 1 KB, or the like) are to be provided to the L-7 module (e.g., because the particular packets may include a security issue).

As another particular example, assume that source device 210 attempts to establish an FTP session with destination device 230. Additionally, assume that source device 210 is associated with a geolocation that includes a high security indicator (e.g., is associated with a high risk country). In this case, network device 220 may identify that the L-7 protocol is FTP and that source device 210 is associated with a high security indicator.

Continuing with the above example, the L-7 module may provide, to the L-4 module, an instruction that identifies that the L-4 module is to provide, for a byte count range (e.g., 0 KB-1 MB), 100% of client-to-server network traffic and 100% of server-to-client network traffic to the L-7 module for upper layer inspection (e.g., an IDP service). Additionally, in this case, the instruction (or another instruction) may identify that, for another byte count range (e.g., 1 MB-5 MB), the L-4 module is to provide 100% of client-to-server network traffic and 50% of server-to-client network traffic to the L-7 module. Still further, the instruction (or another instruction) may identify that, for another byte count range (e.g., 5 MB and greater), the L-4 module is to provide 100% of client-to-server network traffic and 0% of server-to-client network traffic to the L-7 module.

In this way, some implementations described herein provide a network device 220 that may determine a sampling rate at which to perform upper layer inspection based on particular parameter values associated with a flow. In this way, network device 220 may perform upper layer inspection more frequently in association with flows that are more likely to include security issues than as compared to flows that are less likely to include security issues. Additionally, in this way, some implementations described herein conserve computing resources, improve throughput, reduce latency, etc. by reducing an amount of upper layer inspection for flows that are less likely to include security issues. Additionally, in this way, some implementations described herein improve network security by increasing an amount of upper layer inspection for flows that are more likely to include security issues.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Some implementations described herein provide a network device that may determine and/or adjust a sampling rate, at which upper layer inspection of network traffic is performed, based on particular permutations of parameter values of the flow. Thereby, some implementations described herein enable the network device to conserve computing resources and improve network performance by eliminating upper layer inspection from being performed on particular flows and/or particular portions of a flow that are less likely to include security issues than as compared to other flows and/or other portions of the flow. In other words, by determining a sampling rate on a flow basis, implementations described herein improve utilization of L-7 and L-4 resources by allocating resources towards flows that are more likely to include security issues.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
a memory; and
one or more processors to:
receive a first portion of network traffic associated with a flow,
the first portion of network traffic associated with the flow being a first subset of packets included in the flow;
perform a first application layer inspection of the first portion of network traffic associated with the flow;
identify a set of parameters of the flow based on performing the first application layer inspection of the first portion of network traffic associated with the flow;
determine, based on the set of parameters, a sampling rate at which to perform a second application layer inspection of a second portion of network traffic associated with the flow,
the second portion of network traffic associated with the flow being a second subset of packets included in the flow,
the sampling rate indicating a ratio or a percentage of packets, on which the second application layer inspection is to be performed, with respect to a total quantity of packets of the flow that are received,
the sampling rate being greater than zero and less than one, and
the first portion of the network traffic associated with the flow and the second portion of the network traffic associated with the flow being included in a same flow;
instruct a lower layer to use the sampling rate to provide the second portion of network traffic associated with the flow for the second application layer inspection;
perform the second application layer inspection of the second portion of network traffic associated with the flow based on receiving the second portion of network traffic associated with the flow from the lower layer; and
perform an action with regard to the flow based on a result of performing the second application layer inspection.

2. The device of claim 1, where the one or more processors are further to:
identify an application layer application associated with the flow after performing the first application layer inspection of the first portion of network traffic associated with the flow; and
where the one or more processors, when determining the sampling rate, are to:
determine the sampling rate based on the application layer application.

3. The device of claim 1, where the one or more processors are further to:
identify an application layer protocol associated with the flow after performing the first application layer inspection of the first portion of network traffic associated with the flow; and
where the one or more processors, when determining the sampling rate, are to:
determine the sampling rate based on the application layer protocol.

4. The device of claim 1, where the one or more processors are further to:
identify a geolocation of a source device associated with the flow; and
where the one or more processors, when determining the sampling rate, are to:
determine the sampling rate based on the geolocation of the source device.

5. The device of claim 1, where the one or more processors are further to:
determine another sampling rate at which to perform a third application layer inspection of a third portion of network traffic associated with the flow,
the another sampling rate being different than the sampling rate;
instruct the lower layer to use the another sampling rate to provide the third portion of network traffic associated with the flow for the third application layer inspection; and
perform the third application layer inspection of the third portion of network traffic associated with the flow based on receiving the third portion of network traffic associated with the flow from the lower layer.

6. The device of claim 1, where the one or more processors are further to:
determine another sampling rate at which to perform a third application layer inspection of a third portion of network traffic associated with the flow,
the another sampling rate being different than the sampling rate,
the second portion of network traffic being provided by a source device to a destination device associated with the flow, and
the third portion of network traffic being provided by the destination device to the source device;
instruct the lower layer to use the another sampling rate to provide the third portion of network traffic associated with the flow for the third application layer inspection; and
perform the third application layer inspection of the third portion of network traffic associated with the flow based on receiving the third portion of network traffic associated with the flow from the lower layer.

7. The device of claim 1, where the first application layer inspection and the second application layer inspection are performed by an application layer of a communication model,
where the application layer is higher in the communication model than the lower layer.

8. A non-transitory computer-readable medium storing instructions, the instructions comprising:
one or more instructions that, when executed by one or more processors of a device, cause the one or more processors to:
receive a first portion of network traffic associated with a flow,
the first portion of network traffic associated with the flow being a first subset of packets included in the flow;
perform a first application layer inspection of the first portion of network traffic associated with the flow;
identify a set of parameters of the flow based on performing the first application layer inspection of the first portion of network traffic associated with the flow;
determine, based on the set of parameters, a sampling rate at which to perform a second application layer inspection of a second portion of network traffic associated with the flow, the second portion of network traffic associated with
the flow being a second subset of packets included
in the flow,
the sampling rate indicating a ratio or a percentage of
packets, on which the second application layer
inspection is to be performed, with respect to a
total quantity of packets of the flow that are
received,
the sampling rate being greater than zero and less
than one, and
the first portion of the network traffic associated with
the flow and the second portion of the network
traffic associated with the flow being included in a
same flow;
instruct a lower layer to use the sampling rate to
provide the second portion of network traffic associated with the flow for the second application layer
inspection;
perform the second application layer inspection of the
second portion of network traffic associated with the
flow based on receiving the second portion of network traffic associated with the flow from the lower
layer; and
perform an action with regard to the flow based on a
result of performing the second application layer
inspection.

9. The non-transitory computer-readable medium of claim 8, where the one or more instructions, when executed by the one or more processors, further cause the one or more processors to:
identify a uniform resource locator associated with the first portion of network traffic based on performing the first application layer inspection; and
where the one or more instructions, that cause the one or more processors to determine the sampling rate, cause the one or more processors to:
determine the sampling rate based on the uniform resource locator associated with the first portion of network traffic.

10. The non-transitory computer-readable medium of claim 8, where the one or more instructions, when executed by the one or more processors, further cause the one or more processors to:
identify an application associated with the flow based on performing the first application layer inspection; and
where the one or more instructions, that cause the one or more processors to determine the sampling rate, cause the one or more processors to:
determine the sampling rate based on the application.

11. The non-transitory computer-readable medium of claim 8, where the one or more instructions, when executed by the one or more processors, further cause the one or more processors to:
input the set of parameters into a model to obtain an output of the model,
the model having been trained on training data using a machine learning technique; and
where the one or more instructions, that cause the one or more processors to determine the sampling rate, cause the one or more processors to:
determine the sampling rate based on the output of the model.

12. The non-transitory computer-readable medium of claim 8, where the one or more instructions, when executed by the one or more processors, further cause the one or more processors to:
identify an application layer protocol associated with the flow based on performing the first application layer inspection; and
where the one or more instructions, that cause the one or more processors to determine the sampling rate, cause the one or more processors to:
determine the sampling rate based on the application layer protocol.

13. The non-transitory computer-readable medium of claim 8, where the sampling rate is associated with a direction of the flow; and
where the one or more instructions, when executed by the one or more processors, further cause the one or more processors to:
determine another sampling rate, associated with another direction of the flow, at which to perform a third application layer inspection of a third portion of network traffic associated with the flow;
instruct the lower layer to use the another sampling rate to provide the third portion of network traffic associated with the flow for the third application layer inspection; and
perform the third application layer inspection of the third portion of network traffic associated with the flow based on receiving the third portion of network traffic associated with the flow from the lower layer.

14. The non-transitory computer-readable medium of claim 8, where the one or more instructions, when executed by the one or more processors, further cause the one or more processors to:
determine another sampling rate at which to perform a third application layer inspection of a third portion of network traffic associated with the flow;
determine that a condition is satisfied;
instruct, based on the condition being satisfied, the lower layer to use the another sampling rate to provide the third portion of network traffic associated with the flow for the third application layer inspection; and
perform the third application layer inspection of the third portion of network traffic associated with the flow based on receiving the third portion of network traffic associated with the flow from the lower layer.

15. A method, comprising:
receiving, by a device, a first portion of network traffic associated with a flow and a second portion of network traffic associated with the flow,
the first portion of network traffic associated with the flow being a first subset of packets included in the flow, and
the second portion of network traffic associated with the flow being a second subset of packets included in the flow;
identifying, by the device, a set of parameters associated with the flow;
determining, by the device, a sampling rate at which to perform an application layer inspection of the second portion of network traffic associated with the flow based on the set of parameters,
the sampling rate indicating a ratio or a percentage of packets, on which the application layer inspection is to be performed, with respect to a total quantity of packets of the flow that are received,
the sampling rate being greater than zero and less than one, and the first portion of the network traffic associated with the flow and the second portion of the network traffic associated with the flow being included in a same flow;

providing, by the device, an instruction to a lower layer to use the sampling rate to provide the second portion of network traffic associated with the flow for the application layer inspection;

performing, by the device, the application layer inspection of the second portion of network traffic associated with the flow based on receiving the second portion of network traffic associated with the flow from the lower layer; and performing, by the device, an action with regard to the flow based on a result of performing the application layer inspection of the second portion of network traffic associated with the flow.

16. The method of claim 15, further comprising:
identifying a geolocation of a destination device associated with the flow; and
where determining the sampling rate comprises:
determining the sampling rate based on the geolocation of the destination device.

17. The method of claim 15, further comprising:
determining another sampling rate at which to perform another application layer inspection of another portion of network traffic associated with the flow,
the another sampling rate being different than the sampling rate;
instructing the lower layer to use the another sampling rate to provide the another portion of network traffic associated with the flow for the another application layer inspection; and performing the another application layer inspection of the another portion of network traffic associated with the flow based on receiving the another portion of network traffic associated with the flow from the lower layer.

18. The method of claim 15, further comprising:
identifying an application layer protocol associated with the flow; and
where determining the sampling rate comprises:
determining the sampling rate based on the application layer protocol.

19. The method of claim 15, further comprising:
determining that a condition is satisfied;
instructing the lower layer to use another sampling rate to provide another portion of network traffic associated with the flow for another application layer inspection based on the condition being satisfied; and
performing the another application layer inspection of the another portion of network traffic associated with the flow based on receiving the another portion of network traffic associated with the flow from the lower layer.

20. The method of claim 15, further comprising:
performing an initial application layer inspection of the first portion of network traffic associated with the flow; and
where identifying the set of parameters comprises:
identifying the set of parameters based on performing the initial application layer inspection of the first portion of network traffic associated with the flow.

* * * * *